United States Patent
Lee et al.

(10) Patent No.: US 8,223,008 B2
(45) Date of Patent: Jul. 17, 2012

(54) DEVICE AND METHOD FOR PREVENTING WIRETAPPING ON POWER LINE

(75) Inventors: Kyung Hoon Lee, Daejeon (KR); In Ho Hwang, Daejeon (KR); Sea Hoon Ju, Daejeon (KR); Seung Kab Ryu, Daejeon (KR); Jin Chun Wang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1129 days.

(21) Appl. No.: 12/102,067

(22) Filed: Apr. 14, 2008

(65) Prior Publication Data

US 2009/0063602 A1    Mar. 5, 2009

(30) Foreign Application Priority Data

Sep. 5, 2007    (KR) .................... 10-2007-0089877

(51) Int. Cl.
*G08B 1/08* (2006.01)

(52) U.S. Cl. ... 340/538; 340/506; 340/511; 340/538.14; 340/538.15; 340/538.16; 340/6.1; 340/13.23

(58) Field of Classification Search .................. 340/538, 340/506, 511, 512, 538.13, 538.14, 538.15, 340/538.16, 6.1, 13.2, 13.23; 375/340; 379/7; 380/2, 59; 455/133

See application file for complete search history.

(56) References Cited

U.S. PATENT DOCUMENTS

| | | | |
|---|---|---|---|
| 5,099,515 A * | 3/1992 | Kobayashi et al. | 380/2 |
| 5,961,646 A * | 10/1999 | Sokol | 726/15 |
| 6,347,146 B1 * | 2/2002 | Short et al. | 381/15 |
| 6,918,036 B1 * | 7/2005 | Drews | 713/176 |
| 7,769,114 B2 * | 8/2010 | Taya | 375/340 |
| 7,920,822 B2 * | 4/2011 | Chu et al. | 455/1 |
| 2001/0014944 A1 * | 8/2001 | Ibi et al. | 713/183 |
| 2003/0085621 A1 * | 5/2003 | Potega | 307/18 |
| 2004/0082203 A1 * | 4/2004 | Logvinov et al. | 439/10 |
| 2008/0013651 A1 * | 1/2008 | Taya | 375/344 |
| 2008/0063208 A1 * | 3/2008 | Ikushima et al. | 380/278 |

FOREIGN PATENT DOCUMENTS

| | | |
|---|---|---|
| KR | 1020000036697 | 7/2000 |
| KR | 1020020004509 A | 1/2002 |
| KR | 1020030017005 A | 3/2003 |

* cited by examiner

*Primary Examiner* — Daryl Pope

(74) *Attorney, Agent, or Firm* — Ladas & Parry LLP

(57) ABSTRACT

Provided are a device and method for detecting a wiretapping device using a power line and nullifying the wiretapping device. More particularly, a device and method for preventing wiretapping, which sense a wiretapping signal from a power line and transmit a noise signal to the power line, are provided. The device for preventing wiretapping includes: a signal detector for receiving signals from a power line and filtering the received signals in at least one frequency band; a controller for receiving the filtered signal from the signal detector and determining whether a wiretapping signal exists; and a noise signal output unit for transmitting a noise signal to the power line according to whether or not the wiretapping signal exists. The device can detect wiretapping and simultaneously nullify the function of the wiretapping device by detecting a wiretapping signal from a power line and transmitting a noise signal having a frequency corresponding to a frequency band of the wiretapping signal.

12 Claims, 4 Drawing Sheets

DEVICE AND METHOD FOR PREVENTING WIRETAPPING ON POWER LINE

CROSS-REFERENCE TO RELATED APPLICATION

This application claims priority to and the benefit of Korean Patent Application No. 2007-89877, filed Sep. 5, 2007, the disclosure of which is incorporated herein by reference in its entirety.

BACKGROUND

1. Field of the Invention

The present invention relates to a device and method for detecting and nullifying a wiretapping device on a power line, and more particularly, to a device and method for preventing wiretapping, which senses a wiretapping signal from a power line and transmits a noise signal to the power line.

2. Discussion of Related Art

With development of information and communication technology, our life is more convenient but a variety of social problems caused by leaking information arise. In recent times, privacy and human rights are severely infringed by all kinds of illegal wiretapping devices abusing development of various wireless communication devices. Accordingly, many wiretapping detectors are vigorously developed and widely spread to be protected from such illegal wiretapping.

A conventional device for preventing wiretapping is used to detect a wiretapping device attached to a telephone line or transmitting a wireless signal. However, such a conventional wiretapping prevention device cannot detect a high-tech wiretapping device using power line communication technology.

SUMMARY OF THE INVENTION

The present invention is directed to a device and method for preventing wiretapping, which may detect and nullify a wiretapping signal transmitted through a power line.

One aspect of the present invention provides a device for preventing wiretapping, which includes: a signal detector for receiving signals from a power line and filtering the received signals in at least one frequency band; a controller for receiving the filtered signal from the signal detector and determining whether a wiretapping signal exists; and a noise signal output unit for transmitting a noise signal to the power line according to whether or not the wiretapping signal exists.

Another aspect of the present invention provides a method for preventing wiretapping, which includes the steps of: (a) receiving signals from a power line; (b) filtering the received signals in at least one frequency band; (c) determining whether a wiretapping signal exists based on the filtered signal; and (d) transmitting a noise signal to the power line according to whether the wiretapping signal exists.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EXEMPLARY EMBODIMENTS

The foregoing and other objects, features and advantages of the invention will be apparent from the following more particular description of exemplary embodiments of the invention, as illustrated in the accompanying drawings.

Figure 1:
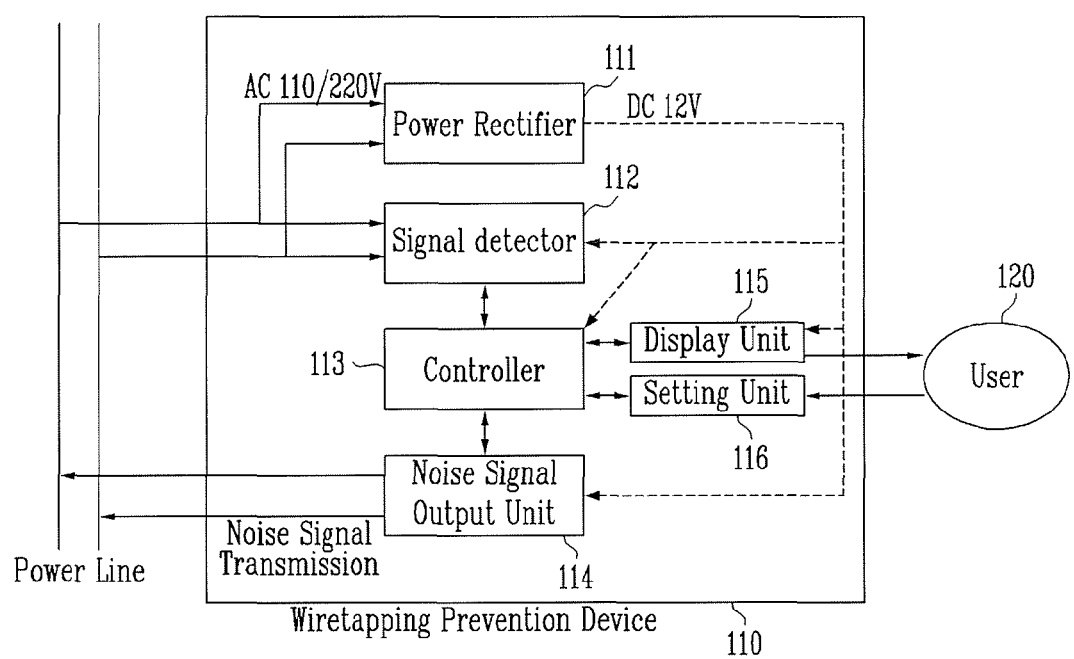
FIG. 1 is a block diagram illustrating a configuration of a device for preventing wiretapping according to an exemplary embodiment of the present invention.

FIG. 1 is a block diagram illustrating a configuration of a device for preventing wiretapping according to an exemplary embodiment of the present invention.

Referring to FIG. 1, a wiretapping prevention device 110 includes a power rectifier 111, a signal detector 112, a controller 113, a noise signal output unit 114, a display unit 115 and a setting unit 116.

The power rectifier 111 generates DC power by rectifying AC power in a power line, and provides the DC power to components constituting the wiretapping prevention device 110. The signal detector 112 detects analog signals by frequencies from the power line and converts the detected analog signals into digital signals in order to determine whether a wiretapping signal exists on the power line. The controller 113 receives the converted digital signals from the signal detector 112 to determine whether the wiretapping signal exists, thereby transmitting a noise signal to the power line through the noise signal output unit 114 when the wiretapping signal exists. A user 120 may set up a frequency band for detecting the wiretapping signal or the power of the output noise signal via the setting unit 116, and identify existence of the wiretapping signal via the display unit 115. In one embodiment, the noise signal output unit 114 may transmit the noise signal to the power line by the power which is set up via the setting unit 116.

Figure 2:
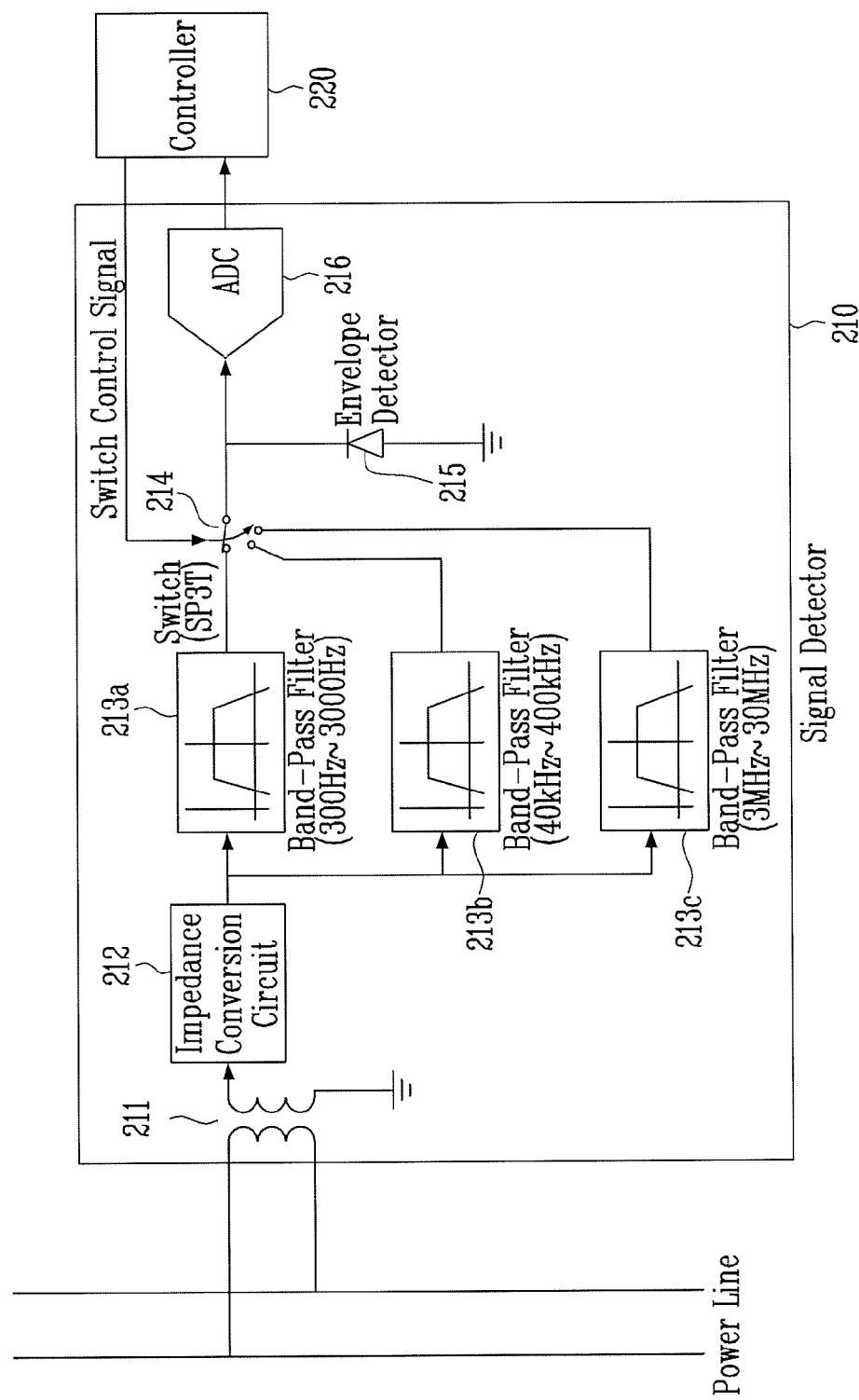
FIG. 2 is a block diagram illustrating a process of detecting a wiretapping signal by a device for preventing wiretapping according to an exemplary embodiment of the present invention.

FIG. 2 is a block diagram illustrating a process of detecting a wiretapping signal by a device for preventing wiretapping according to an exemplary embodiment of the present invention.

Referring to FIG. 2, a signal detector 210 receives signals from a power line through a transformer 211 and an impedance conversion circuit 212. Thereafter, the signal detector 210 divides the received signals by frequency bands using band-pass filters 213a, 213b and 213c. In one embodiment, the frequency bands of the band-pass filters 213a, 213b and 213c may include a voice band (300 Hz~3000 Hz), a narrowband power line communications band (40 kHz~400 kHz) and a broadband power line communications band (3 MHz~30 MHz).

The signal passing through the band-pass filter is selected by a single-pole triple-throw (SP3T) switch 214, and applied to an envelope detector 215. A data signal detected by the envelope detector 215 is converted into a digital signal by an analog-to-digital converter 216 and then transmitted to a controller 220.

The controller 220 controls the SP3T switch 214 to select a frequency band of the input signal and receive a digital signal corresponding to the selected frequency band from the signal detector 210. The controller 220 calculates signal energy in the selected frequency band based on the received digital signal, and compares the calculated signal energy with a predetermined threshold value, thereby determining whether a wiretapping signal exists. Generally, power provided to a local office or home is 220V/60 Hz, so that if a wiretapping device using a power line as a transmission medium is installed or power line communications which are unknown to users are made, signals having a frequency of several hundreds of kHz to several tens of MHz exist on the power line. Accordingly, the controller, as described above, may determine whether or not a signal having a frequency out of the frequency band used for power supply exists, thereby determining whether or not a wiretapping signal exists.

Figure 3:
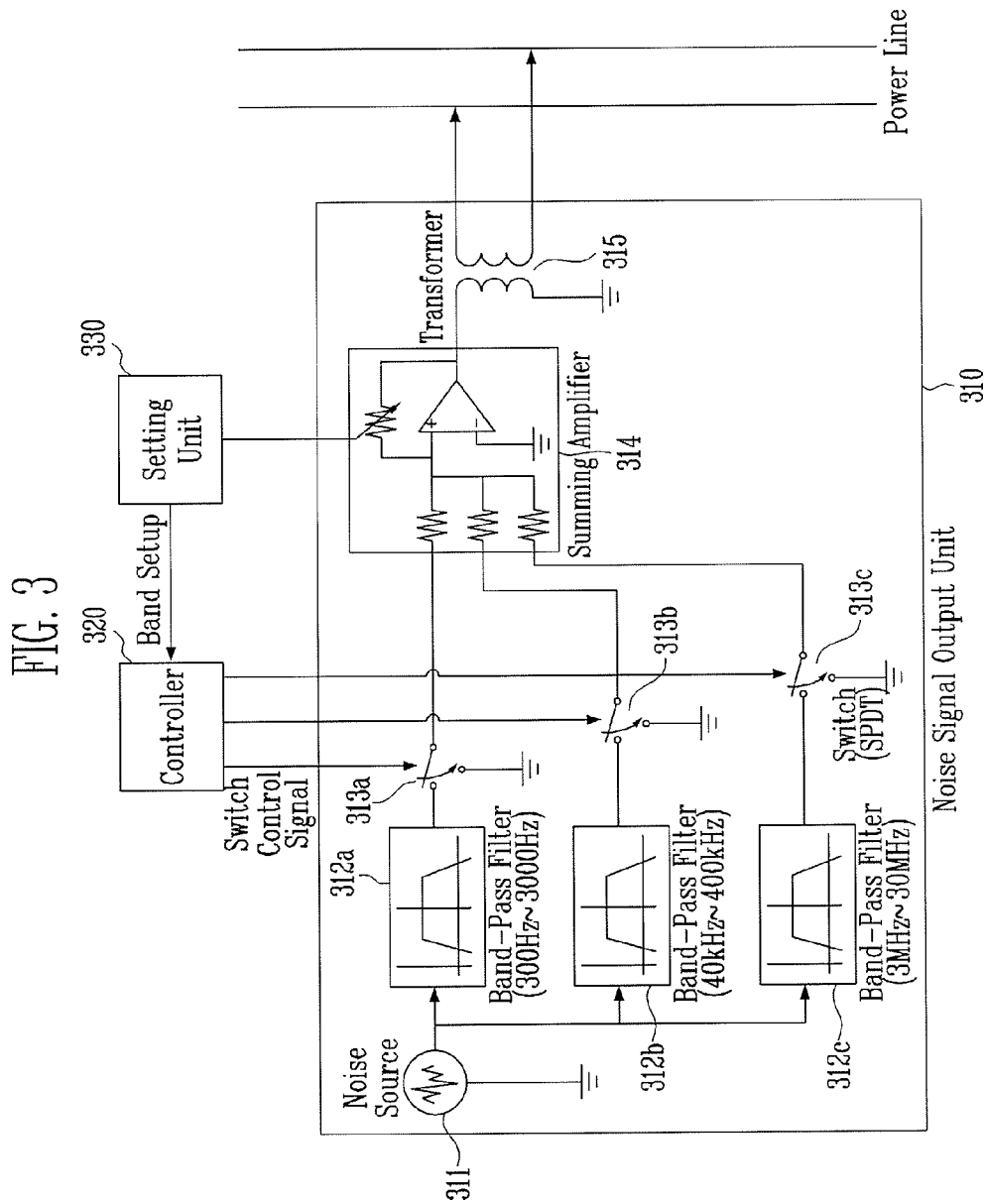
FIG. 3 is a diagram illustrating a configuration of a noise signal output unit included in a device for preventing wiretapping according to an exemplary embodiment of the present invention.

FIG. 3 is a diagram illustrating a configuration of a noise signal output unit included in a device for preventing wiretapping according to an exemplary embodiment of the present invention.

Referring to FIG. 3, a noise signal output unit 310 first divides noise signals generated from a broadband noise source 311 for each frequency band using band-pass filters 312a, 312b and 312c. The frequency bands may correspond to those used for the band-pass filters 213a, 213b and 213c of the signal detector 210. That is, a noise signal in a frequency band which is the same as that of the detected wiretapping signal may be generated to interrupt transmission of a wiretapping signal by the wiretapping device.

A controller 320 may control each of single-pole double-throw (SPDT) switches 313a, 313b and 313c to transmit noise signals in a frequency band at which the wiretapping signal is detected or in a frequency band selected by a user.

The noise signals selected by the SPDT switches 313a, 313b and 313c are summed and amplified through a summing amplifier 314. In one embodiment, a setting unit 330 may control a gain of the summing amplifier 314 according to a predetermined value set by a user. The noise signal amplified by the summing amplifier 314 is finally transmitted to the power line through a transformer 315.

Figure 4:
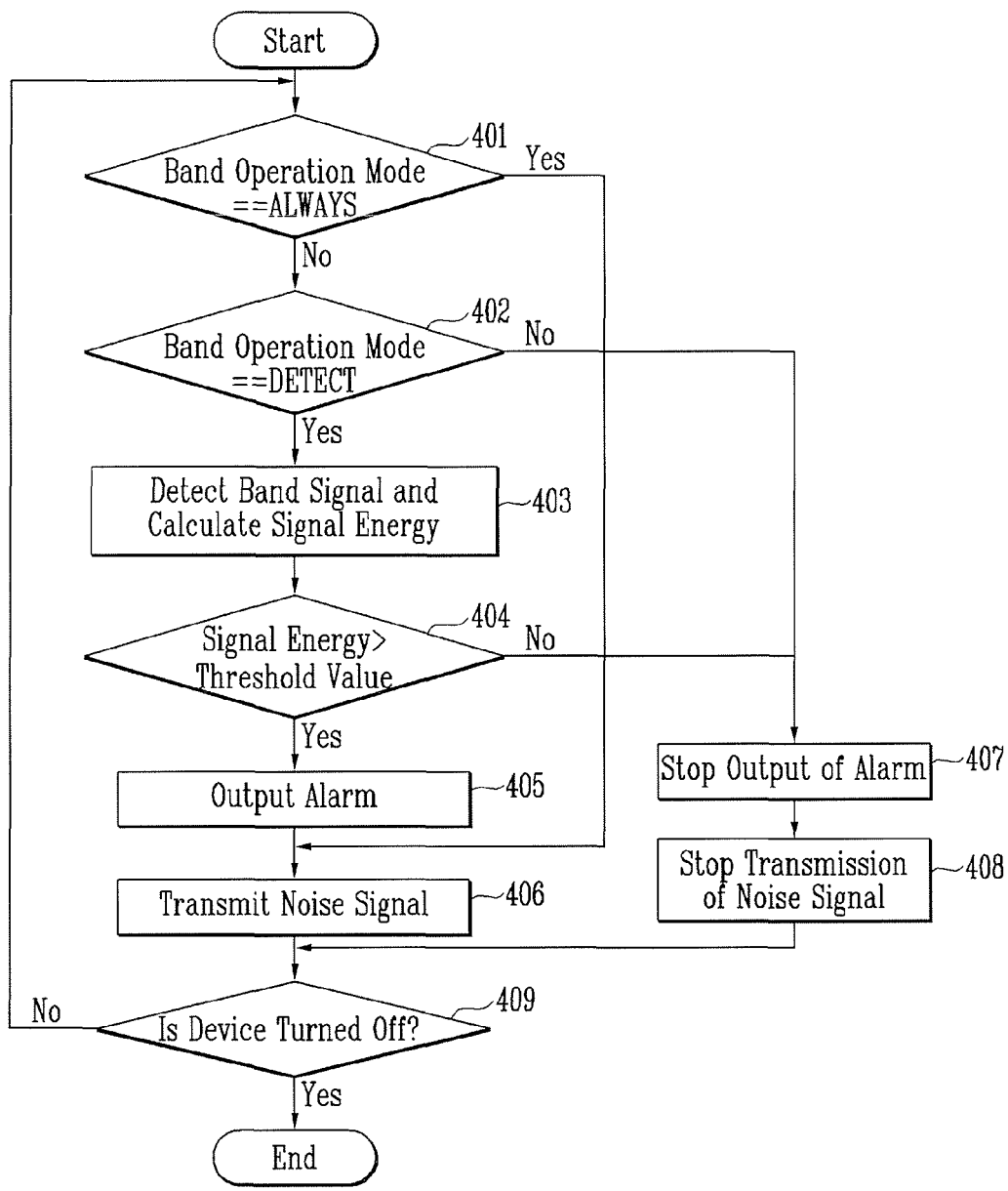
FIG. 4 is a flowchart illustrating a process of transmitting a noise signal from a device for preventing wiretapping according to an exemplary embodiment of the present invention.

FIG. 4 is a flowchart illustrating a process of transmitting a noise signal from a device for preventing wiretapping according to an exemplary embodiment of the present invention.

A wiretapping prevention device may detect a wiretapping signal and transmit a noise signal in each frequency band based on a band operation mode for each frequency band input by a user through a setting unit. In one embodiment, the band operation mode to be input by the user may include ALWAYS, DETECT and NONE. ALWAYS denotes unconditional output of a noise signal, DETECT denotes output of a noise signal when a wiretapping signal exists, and NONE denotes no output of a noise signal.

Referring FIG. 4, a controller first determines whether the band operation mode is set to ALWAYS (401), and transmits a noise signal in a corresponding frequency band to a power line when the band operation mode is set to ALWAYS (406).

If the band operation mode is not set to ALWAYS, the controller determines whether the band operation mode is set to DETECT (402), detects a signal in the corresponding frequency band from the power line when the band operation mode is set to DETECT, and calculates signal energy based on the detected signal (403). Thereafter, the controller compares the calculated signal energy with a predetermined threshold value (404), and if the calculated energy is greater than the threshold value, the display unit outputs an alarm signal informing of sensing of a wiretapping signal to the user, and then the noise signal output unit transmits the noise signal in the corresponding frequency band to the power line (405 and 406). On the other hand, if the calculated energy is smaller than the threshold value, the display unit stops outputting the alarm signal informing of sensing of the wiretapping signal, and the noise signal output unit stops transmission of the noise signal in the corresponding frequency band (407 and 408).

In step 402, if the band operation mode is not set to DETECT, that is, the band operation mode is set to NONE, the output of the alarm signal informing of sensing of the wiretapping signal and transmission of the noise signal in the corresponding frequency band are stopped (407 and 408).

Steps 401 to 408 based on the band operation mode are repeatedly performed in respective bands until the wiretapping device is turned off (409).

The present invention can detect a wiretapping signal and simultaneously nullify a wiretapping device by detecting the signal from a power line and transmitting a noise signal having a frequency corresponding to a frequency band of the wiretapping signal to the power line.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A device for preventing wiretapping, comprising:
   a signal detector for receiving signals from a power line and filtering the received signals in at least one frequency band, wherein the at least one frequency band is set by a user's input;
   a controller for receiving the filtered signal from the signal detector and determining whether a wiretapping signal exists; and
   a noise signal output unit for transmitting a noise signal to the power line according to whether or not the wiretapping signal exists.

2. The device according to claim 1, further comprising:
   a setting unit for setting up the at least one frequency band or a power of the noise signal based on a user's input,
   wherein the noise signal output unit transmits the noise signal according to the power of the noise signal set up by the setting unit.

3. The device according to claim 1, further comprising:
   a display unit for displaying to a user whether the wiretapping signal exists.

4. The device according to claim 1, wherein the at least one frequency band comprises at least one of 300 Hz to 3000 Hz, 40 kHz to 400 kHz and 3 MHz to 30 MHz.

5. The device according to claim 1, wherein the noise signal output unit transmits a noise signal having the at least one frequency band.

6. The device according to claim 1, wherein the controller calculates signal energy based on the filtered signal, and compares the calculated signal energy with a predetermined threshold value to determine whether the wiretapping signal exists.

7. A method for preventing wiretapping, comprising the steps of:
   (a) receiving signals from a power line;
   (b) filtering the received signals in at least one frequency band, wherein the at least one frequency band is set by a user's input;
   (c) determining whether a wiretapping signal exists based on the filtered signal; and
   (d) transmitting a noise signal to the power line according to whether the wiretapping signal exists.

8. The method according to claim 7, after the step (d), further comprising the step of:

displaying whether the wiretapping signal exists to the user.

9. The method according to claim 7, wherein the at least one frequency band comprises at least one of 300 Hz to 3000 Hz, 40 kHz to 400 kHz, and 3 MHz to 30 MHz.

10. The method according to claim 7, wherein, in the step (d), the noise signal is transmitted in the at least one frequency band.

11. The method according to claim 7, wherein, in the step (d), the noise signal is transmitted by the power set by a user's input.

12. The method according to claim 7, wherein, in the step (c), signal energy is calculated based on the filtered signal, and the calculated signal energy is compared with a predetermined threshold value to determine whether the wiretapping signal exists.

* * * * *